B. C. DONHAM.
COMPRESSED AIR WASHER.
APPLICATION FILED DEC. 6, 1915.
1,222,541.
Patented Apr. 10, 1917.
3 SHEETS—SHEET 2.
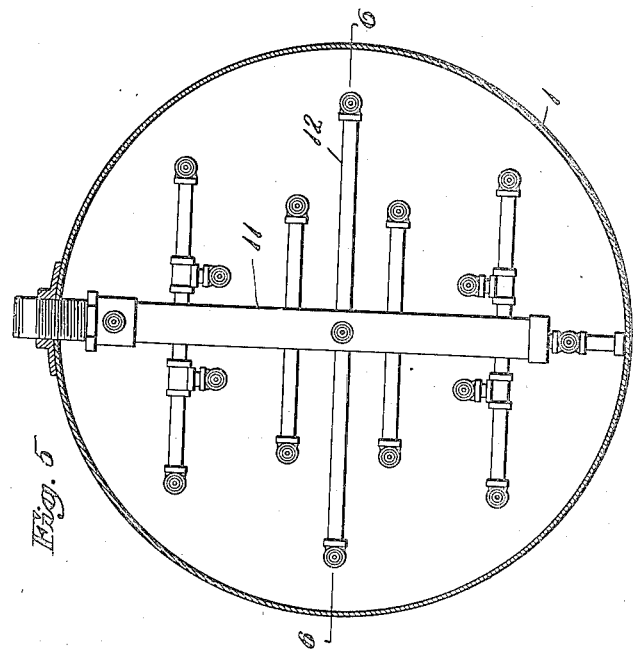
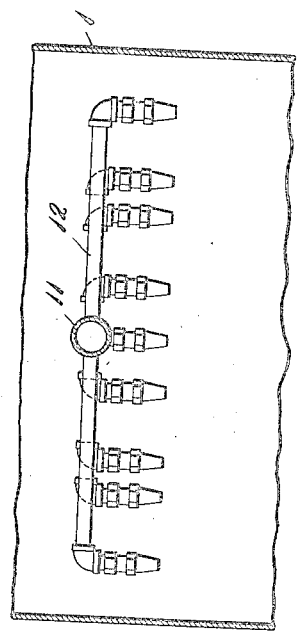
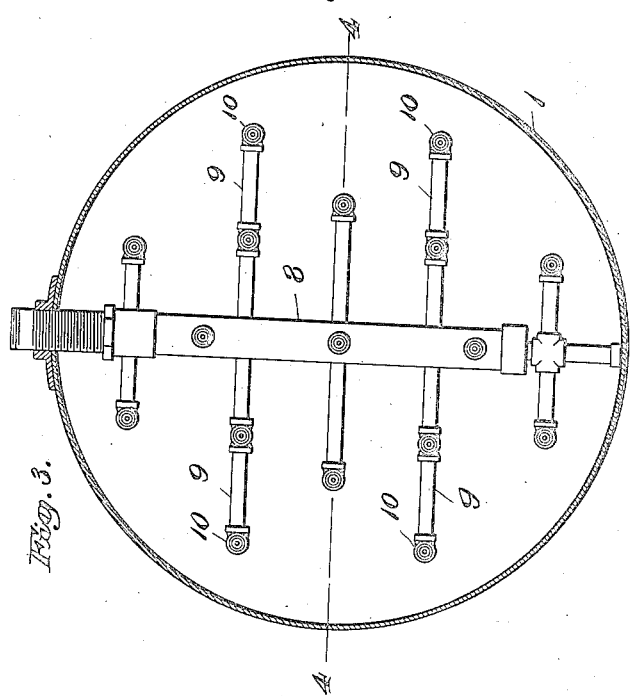
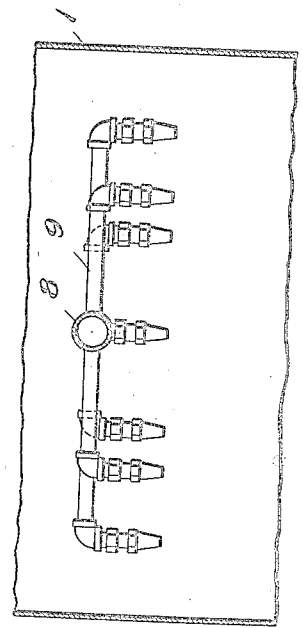
Inventor:
Benjamin C. Donham

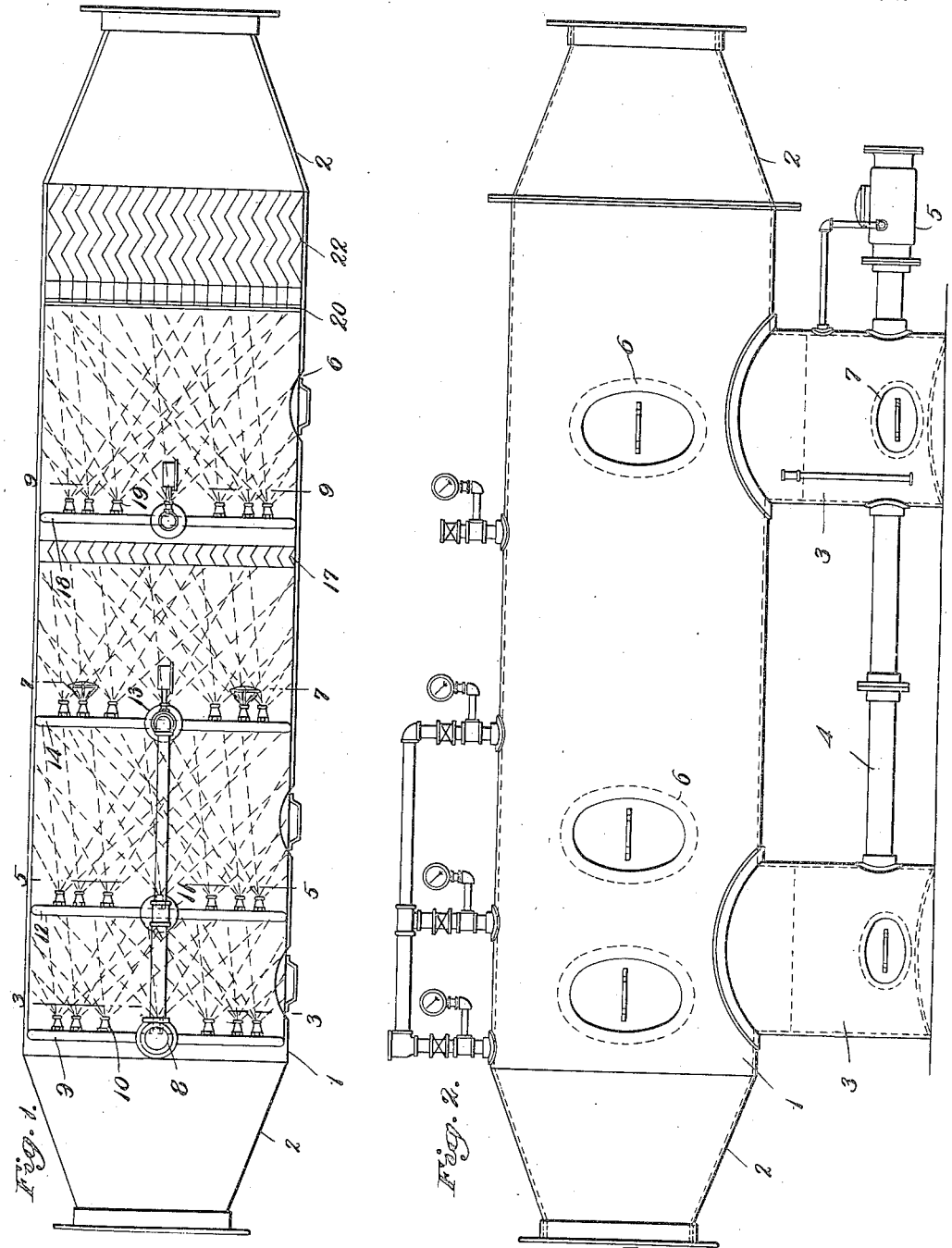

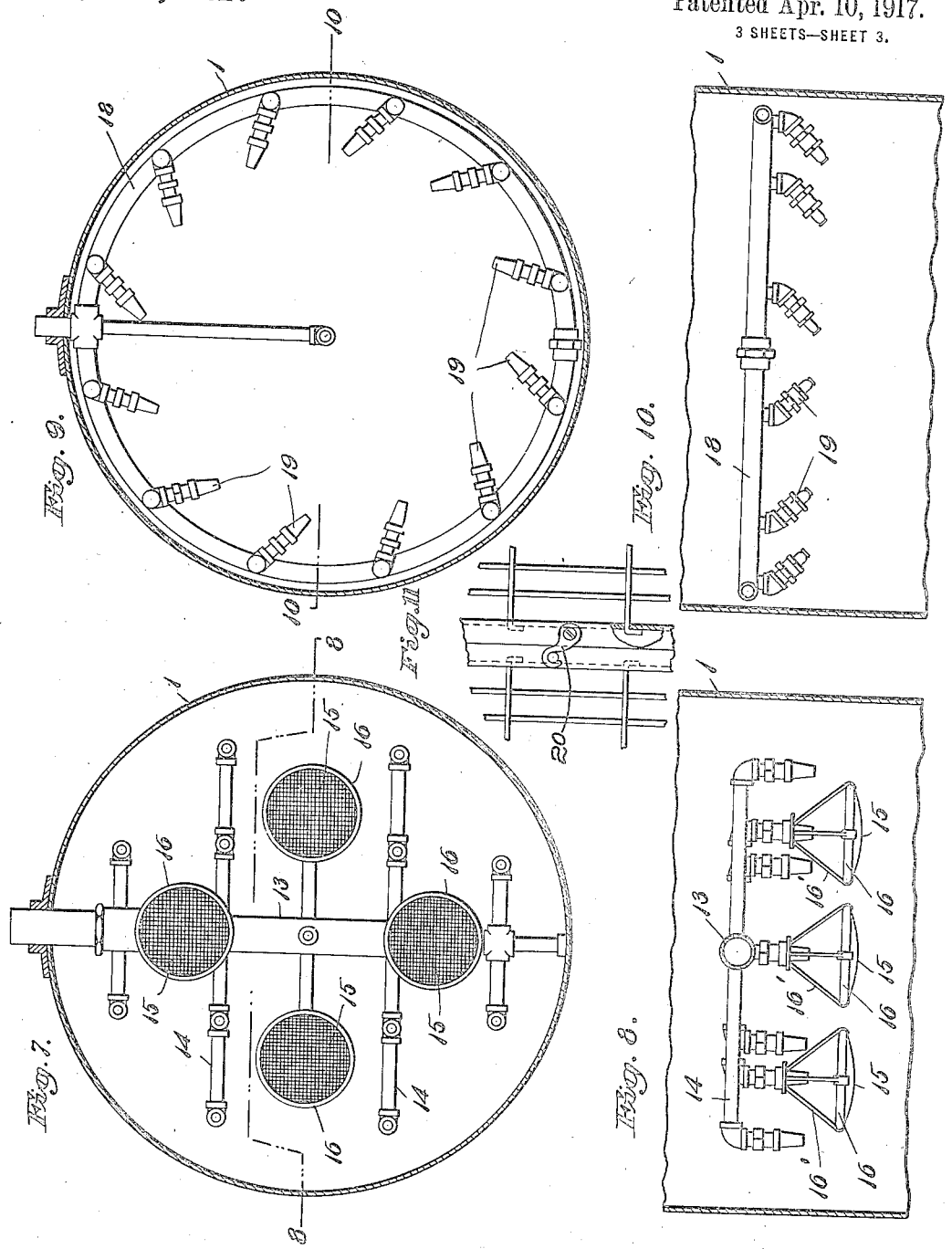

UNITED STATES PATENT OFFICE.

BENJAMIN C. DONHAM, OF GLEN RIDGE, NEW JERSEY, ASSIGNOR TO SPRAY ENGINEERING COMPANY, OF BOSTON, MASSACHUSETTS, A CORPORATION OF MASSACHUSETTS.

COMPRESSED-AIR WASHER.

1,222,541.                Specification of Letters Patent.      Patented Apr. 10, 1917.

Application filed December 6, 1915. Serial No. 65,214.

*To all whom it may concern:*

Be it known that I, BENJAMIN C. DONHAM, a citizen of the United States, and a resident of Glen Ridge, in the county of Essex and State of New Jersey, have invented an Improvement in Compressed-Air Washers, of which the following description, in connection with the accompanying drawings, is a specification, like characters on the drawings representing like parts.

This device relates to air washers and more particularly to a device designed to purify compressed air. By way of an example I will mention its use in connection with a yeast tank in which air under a low pressure is bubbled up through the tank. A washer such as I have shown would be interposed between the compressor and the yeast tank in the compressed air line. It is not to be understood however, that my washer is in any way limited to this specific use.

My invention will be best understood by referring to the following description and the accompanying drawings wherein—

Figure 1 is a plan view of the washer with the upper part of the casing removed to show the interior structure, Fig. 2 is a side elevation thereof, Fig. 3 is a cross section on the line 3—3 of Fig. 1, Fig. 4 is a section on the line 4—4 of Fig. 3, Fig. 5 corresponds to Fig. 3 and is on the line 5—5 of Fig. 1, Fig. 6 is a section of Fig. 5 on the line 6—6, Figs. 7 and 9 are similar sections on the like numbered lines of Fig. 1 and Figs. 8 and 10 sections of Figs. 7 and 9, and Fig. 11 is a detail view illustrating the eliminator screen.

As shown in Figs. 1 and 2 my washer comprises a casing adapted to be interposed in and form a part of the compressed air line or air conduit. This casing may be and preferably is formed with a cylindrical body portion 1 and is connected to the air pipe line in any suitable manner as by the conical end portions 2. The casing is supported on one or more water-boxes 3, two being shown in the illustrated embodiment now being described, these boxes as shown being provided with the equalizing pipe 4 and the over-flow pipe 5 controlled by any suitable form of valve not necessary here to describe, designed to maintain a constant level in the water-boxes. The body of the casing may be provided with suitable manholes as shown at 6 and the water-boxes with handholes 7. It will be understood that the air delivered from the compressor passes longitudinally through the casing shown from left to right, and in so passing is subjected to the action of the various washing devices, which I will now proceed to describe.

Referring to Figs. 1, 3 and 4, wherein I have illustrated the first washing device or driving spray, it will be seen that a pipe 8 is provided tapped into the top of the casing and having its lower end held rigid at the bottom thereof. Branch pipes 9 are connected with the main pipe 8 and along this main pipe and the branch pipes are arranged suitable spray nozzles which may be and preferably are of the form shown in the patent to Aubrey G. Eneas, 1,101,264, June 23, 1914. As shown in Figs. 3 and 4, these nozzles are distributed throughout the cross section of the casing so that the sprays issuing from them come into contact with practically the whole body of air passing through the line. These nozzles point in the same direction as the flow of the air current and, discharging directly into the air, have a tendency to drive it forward through the casing.

In the embodiment of the invention herewith illustrated, I have shown a second set of these driving nozzles, which as shown in Figs. 5 and 6 are arranged on the main pipe 11 and branch pipes 12 corresponding to the pipes 8 and 9 of Figs. 3 and 4. As illustrated, the arrangement of nozzles on the pipes 11 and 12 is somewhat different from the arrangement in Figs. 3 and 4, the object being to more thoroughly distribute the water throughout the section of the casing. It will be understood that any number of sets of these driving nozzles whether two as shown, or one or any number, may be employed.

Referring now to Figs. 1, 7 and 8, it will be seen that beyond the two sets of driving nozzles I have provided another set of nozzles disposed on the pipe 13 and the branch pipes 14. These nozzles are of the same kind as those shown in Figs. 3 to 6 and also point in the direction of movement of the air current, but some or all of them are provided with atomizing screens 15 as shown in Figs. 7 and 8, these screens being supported in front of the nozzles by the circular frames 16 held by the arms 16'. The object of these screens is to effect a greater sub-division of the water than is possible by the use of a nozzle alone. The air after being washed by the sets of sprays shown in Figs. 3 and 5 is subsequently subjected to the action of the still finer spray of this set of nozzles.

By the described device, I carry out a method also forming part of my invention, and in accordance with which liquid is discharged in successively finer conditions of sub-division through the air, or in different conditions of fineness of sub-division. Although I have represented and described the water as issuing in successively finer conditions of sub-division, I am not necessarily restricted thereto, as the water or other liquid may be discharged in different degrees of fineness of sub-division in any preferred sequence.

I am aware that it has been proposed to purify and humidify air by discharging steam and also hot water thereinto.

In discharging liquid in accordance with my invention in different degrees of fineness of sub-division into air, I preferably provide screens to effect an atomization of the liquid, thus producing the finer sub-division of the liquid.

Such atomization of the liquid is not intended for the purpose of securing vaporization, but to provide free moisture for the purpose of taking up foreign particles and depositing them. Steam cannot be relied upon for this purpose, and being a gas or vapor, it will float along in the air and not pick up foreign particles. The atomized water is free moisture and is not in suspension, and therefore falls of its own weight. It is, of course, possible that some vaporization may occur due to evaporation, and obviously depending on whether or not the air that is being cleaned is of one hunderd per cent. relative humidity.

I desire it to be understood that the references in the claims and elsewhere to different conditions of fineness of sub-division and the kindred references are not to be taken as constituting limitations to the use of two or more nozzles or spraying devices, one of such nozzles having in advance thereof means to effect atomization of the liquid, since within the broad scope and purpose of my invention the different conditions of fineness of sub-division may be effected by the provision of a single nozzle or a single set of nozzles, all having liquid atomizing means thereon or in advance thereof, the liquid being discharged into the air from such nozzle or nozzles in one condition of fineness of sub-division, and then atomized by the screen or screens of such nozzle or nozzles, thereby to effect a greater degree of fineness of sub-division.

In the illustrative embodiment shown, I have disclosed, succeeding the washing device just described, a set of eliminator plates 17. These may be of any convenient form but as shown they are made up of a number of parallel plates of V-shape or trough-like form, which are placed side by side and present a number of diagonal surfaces or louvers in the path of the current of air which is passing through the washer. The particles of water sustained in the current strike these plates and are eliminated thereby from the air, running down the surfaces of the plates and leaving the casing by one of the water-boxes 3. The use of eliminator plates as shown is useful and desirable in any washer but they need not necessarily be used and the particular purpose of them in the embodiment here illustrated will be hereinafter explained.

Succeeding the eliminator plates 17 are the scrubbing nozzles shown in Figs. 1, 9 and 10. Referring to Fig. 9 it will be seen that I have provided a pipe 18 which surrounds the casing at the interior thereof. On this pipe are disposed the spray nozzles 19 of the kind already mentioned but which are disposed diagonally to the axis of the cylindrical casing 2 and also diagonally to the radii of the circle formed by the pipe 18. These nozzles therefore discharge their sprays transversely to the current of air moving through the casing and give a certain whirling or spiral movement thereto. By this means the contact of water with any portion of air that might have escaped the action of the direct nozzles of the previous washing devices is insured.

After contact with the spraying devices described, the air is thoroughly washed and the next operation must be that of removing the surplus water carried by the air current. For this purpose I have provided the screen 20 and the baffle elements or eliminator plates 22, as shown in Fig. 1. A detail of the screen 20 is shown in Fig. 11, from which it will be seen that it consists of a screen or mesh which is preferably elongated in the vertical direction. As the air passes through this screen a great deal of the water is removed therefrom and flows down the wires of the screen to the bottom of the casing and to water-box 3. The air with any water which may still remain in it, now enters between the eliminator plates 22, which plates are similar to the plates 17, but of greater length being formed sinuous or zig-zag and therefore presenting tortuous passages to the water-laden current of air. Describing them differently it may be said that they present diagonal surfaces arranged like louvers or the slats of a blind, first in one direction and then in the other. The particles of water strike against these diagonal surfaces and either run directly down them or bounce from one to another until they do run down and out into the water-box 3. By these means air issues from the right-hand end of the washer perfectly clean and dry although with a humidity of 100%.

The water is supplied to the pipes 8, 11, 13 and 18 through any suitable regulating valves or connections and in the embodiment of the invention shown the pipes 8, 11 and 13 have a separate water supply from the pipe 18. The reason for this is to permit salt, brackish or otherwise impure water to be used. Such water is supplied to the first three sets of washing nozzles and is for the most part removed from the air by the eliminator plates 17 previously described. The air is then subjected to the action of the scrubbers 19 which are supplied with fresh water through a separate connection and the washing is completed with this pure water. It will be understood, however, that this construction is not an essential part of my invention considered in its broader aspect and since the water may be arranged in a closed circuit and used over and over again, comparatively small advantage is gained by the partial use of impure water.

Referring now to Fig. 1 the operation of the device may be readily followed. The air entering at the left-hand end is subjected to the action of finely divided water issuing from any desired number of spray nozzles which drive it forward toward the right carrying the air along with it. The partially washed air then comes in contact with the water discharged through the screens 15 and as it is in a finer state of sub-division than that previously used the air is thus still more thoroughly washed. If such an operation is desired, part of the water may be eliminated from the air at this point as, in the embodiment illustrated, by means of eliminator plates 17 or equivalent devices. Passing from the zone of action of the screened sprays through the eliminator plates 17, if such plates are used, the air is then subjected to the cross action of the nozzles 19 or scrubbing nozzles which complete the washing process. From these nozzles the air passes through water eliminating devices herein shown as consisting of a screen 20 and a set of eliminator plates 22 and then leaves the casing to be used for any desired purpose.

While I have shown herein one specific form of my invention and have described it in considerable detail, it will be obvious that my invention is capable of various modifications.

I claim:

1. An air washer comprising a conduit for the air, and means to pass liquid in different conditions of fineness of sub-division into said air, and including means to effect atomization of the liquid, but retaining it in a condition of free moisture, whereby foreign particles may be precipitated by such free moisture.

2. An air washer comprising a conduit for the air, and means to pass liquid in successively finer conditions of sub-division into said air, and including means whereby the liquid in its finest condition of sub-division is retained as free moisture for the precipitation of foreign particles.

3. An air washer comprising a conduit for the air, means to discharge finely divided liquid throughout the cross section of said conduit and in the direction of movement of said air and means subsequently to discharge finely divided liquid in diagonal paths toward the center of the air stream.

4. An air washer comprising a conduit for the air, two sets of means for discharging finely divided liquid throughout said air, one of said means having atomizing screens, a liquid removing device interposed therebetween and separate supply connections for said discharging means.

5. An air washer comprising a conduit for the air, two sets of means for discharging finely divided liquid throughout said air, a liquid removing device interposed therebetween, a liquid removing device succeeding said means and separate supply connections for said discharging means.

6. A device for removing liquid from a current of air passing through a conduit comprising an upright screen extending across said conduit and a device presenting a tortuous path to the current.

7. A device for removing liquid from a current of air passing through a conduit comprising an upright screen of vertically elongated mesh extending across said conduit and a device presenting a tortuous path to the current.

8. An air washer comprising an air conduit, a plurality of spray nozzles discharging directly into the air and a succeeding plurality discharging through atomizing screens.

9. An air washer comprising an air conduit, a plurality of spray nozzles discharging directly into the air, a succeeding plurality discharging through atomizing screens, the aforesaid nozzles discharging in the direction of movement of the air, and succeeding nozzles discharging transverse thereto.

10. A washer for a compressed air pipe line comprising a cylindrical casing constructed to be interposed in and form part of said line, a water box supporting said casing and washing devices in said casing comprising spray nozzles distributed substantially throughout the cross section thereof, one or more of said nozzles having atomizing screens.

11. In an air washer a conduit for the air and washing means therein comprising a set of nozzles arranged on radii from the center of said conduit and discharging obliquely in the same sense to their respective radii.

12. A washer for an air conduit comprising a casing constructed to be interposed in and form part of said conduit and a washing device in said casing comprising a main pipe entering and extending diametrically across the same, branch pipes extending therefrom and a set of spray nozzles disposed in staggered relation on said pipes whereby thorough washing is effected throughout the cross section of said casing.

13. That method of washing air which comprises discharging liquid into the air in successively finer conditions of sub-division and maintaining the liquid at substantially the same temperature at the several points of discharge.

14. An air washer comprising a conduit for the air and means to discharge liquid thereinto through successively finer divisions, said means including a set of nozzles, and a second set of nozzles having screens positioned to intercept the liquid discharged therefrom.

15. An air washer comprising a conduit for the air and means to discharge liquid in successively finer conditions of such divisions through said air, said means including atomizing devices for securing the more finely sub-divided condition of the liquid.

16. An air washer comprising a conduit for the air, and means to discharge liquid through said air in different conditions of fineness of sub-division, said means including atomizing devices for securing the more finely sub-divided conditions of the liquid.

17. That method of washing air which comprises discharging liquid into the air in different conditions of fineness of sub-division and maintaining the lquid at substantially the same temperature at the several points of discharge.

18. An air washer comprising a conduit for the air and a plurality of means to discharge liquid through said air, at least one of said means having in advance of the discharge point for the air a screen-like atomizing device whereby the liquid is more finely sub-divided.

19. An air washer comprising a conduit, means to pass compressed air therethrough, and means to discharge liquid into said air in different conditions of fineness of sub-division, said means including atomizing devices for securing the more finely sub-divided conditions of such liquid.

20. An air washer comprising a conduit, means for passing compressed air therethrough, and means to pass liquid into said air in different conditions of fineness of sub-division while retaining said liquid substantially as free moisture for precipitation of foreign particles.

In testimony whereof, I have signed my name to this specification, in the presence of two subscribing witnesses.

BENJAMIN C. DONHAM.

Witnesses:
SOPHIE HENSEL,
AUSTIN ADAMS, JR.